March 28, 1939.　　　H. HARDENSETT　　　2,151,759

EXTERNAL COMBUSTION ENGINE

Filed March 2, 1936　　　5 Sheets-Sheet 1

Inventor:
Heinrich Hardensett
By A. M. Weller
Attorney

March 28, 1939.  H. HARDENSETT  2,151,759

EXTERNAL COMBUSTION ENGINE

Filed March 2, 1936  5 Sheets-Sheet 2

Inventor:
Heinrich Hardensett
By
Attorney

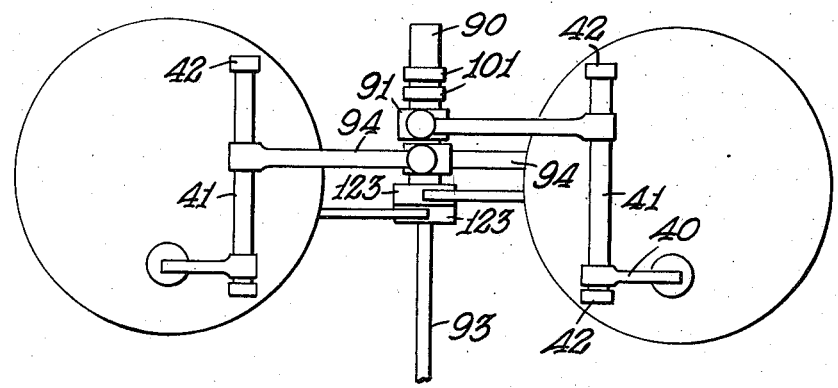
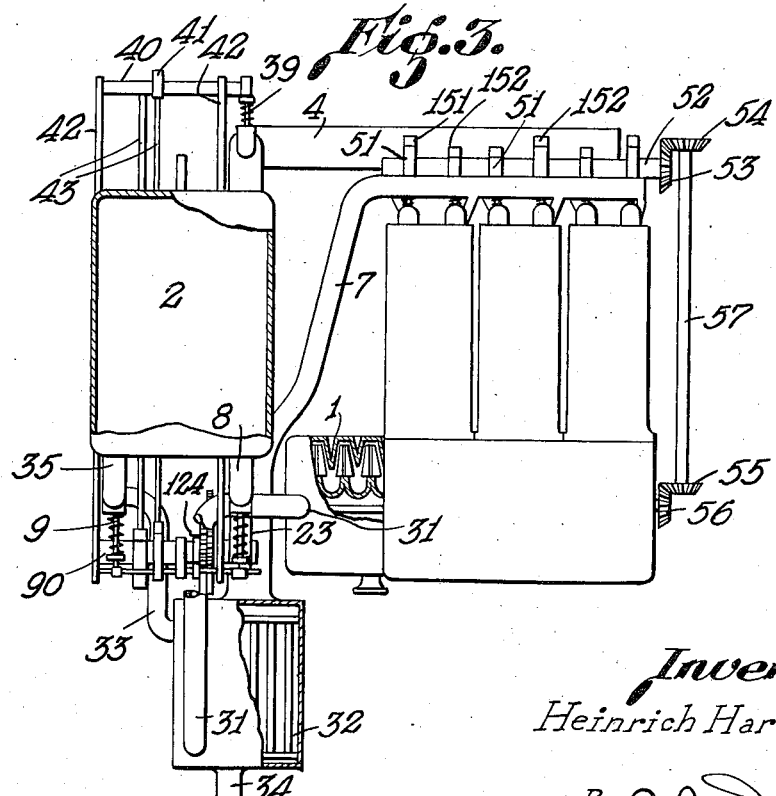

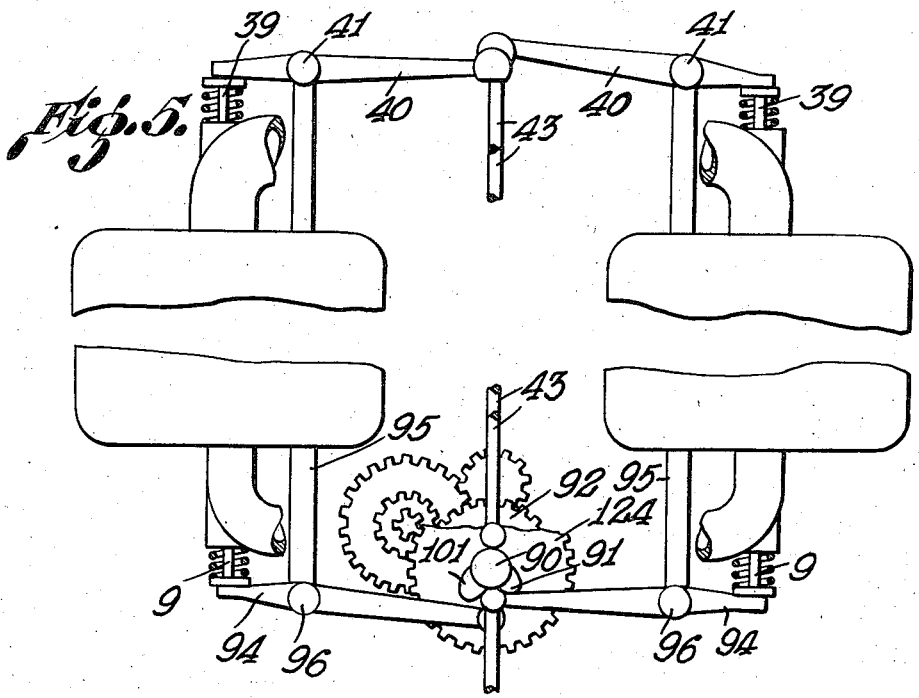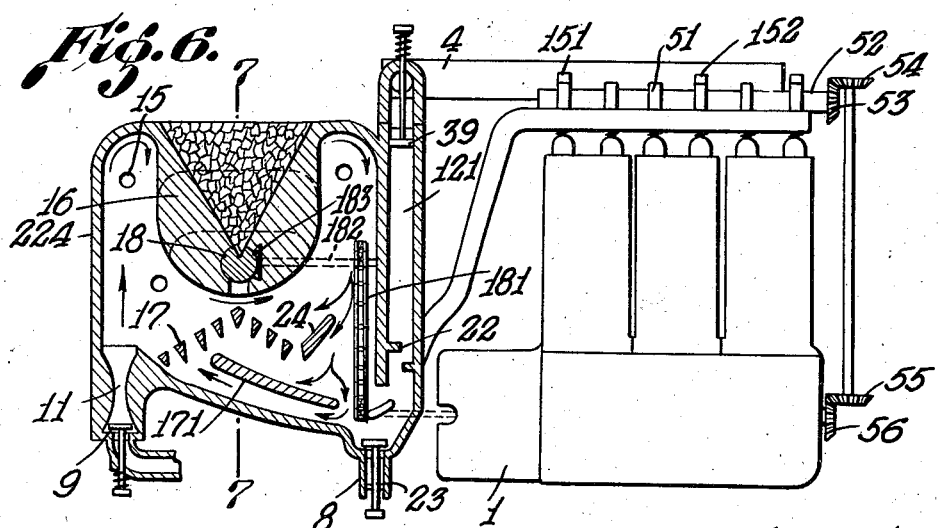

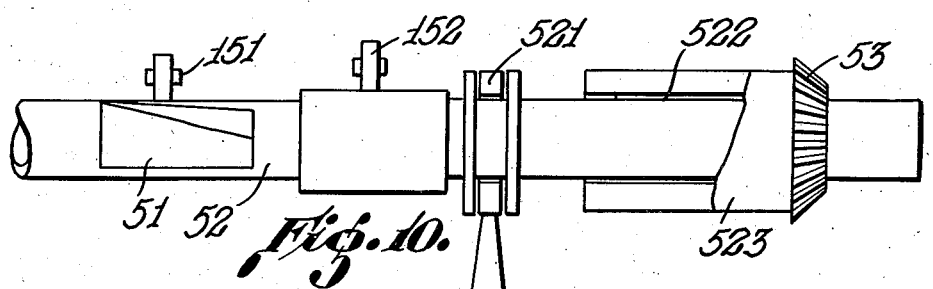
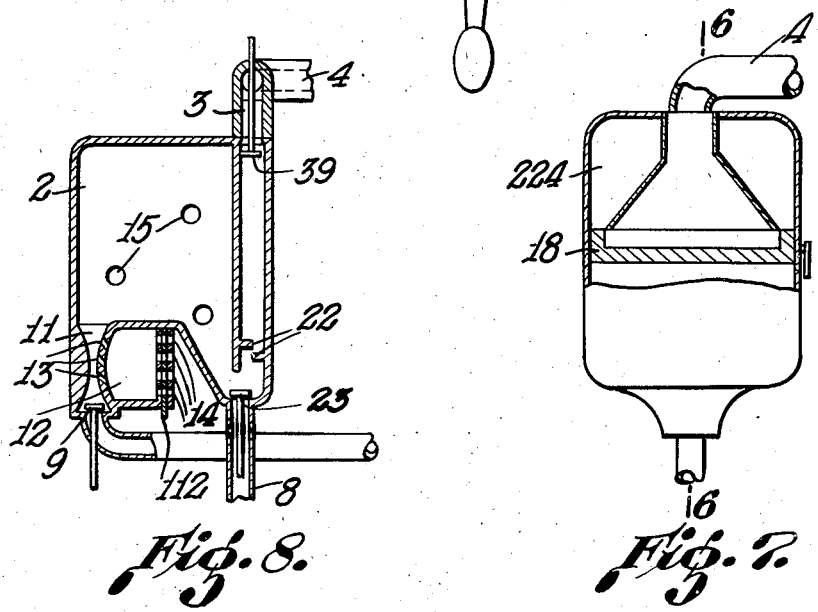
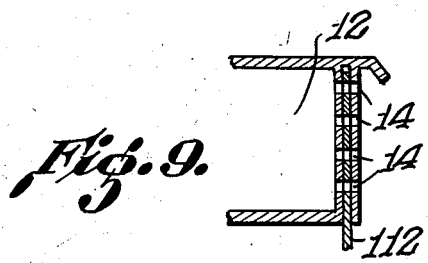

Patented Mar. 28, 1939

2,151,759

UNITED STATES PATENT OFFICE 2,151,759

EXTERNAL COMBUSTION ENGINE

Heinrich Hardensett, Constance, Germany

Application March 2, 1936, Serial No. 66,733
In Germany December 6, 1934

2 Claims. (Cl. 60—44)

This invention relates to external combustion engines comprising a plurality of power cylinders to which combustion gases under pressure are admitted from separate combustion chambers to operate the engine.

One object of the invention is to provide an engine of the type referred to in which the cycle of operations in each combustion chamber can be spread over a number of revolutions of the engine shaft, so as to enable the ignition and combustion of the fuel to be extended over any desired period independently of the speed of the engine.

A further object of the invention is to provide a construction which will enable dusty and solid fuels to be employed.

The invention is illustrated by way of example in the accompanying drawings, in which—

Figure 1:
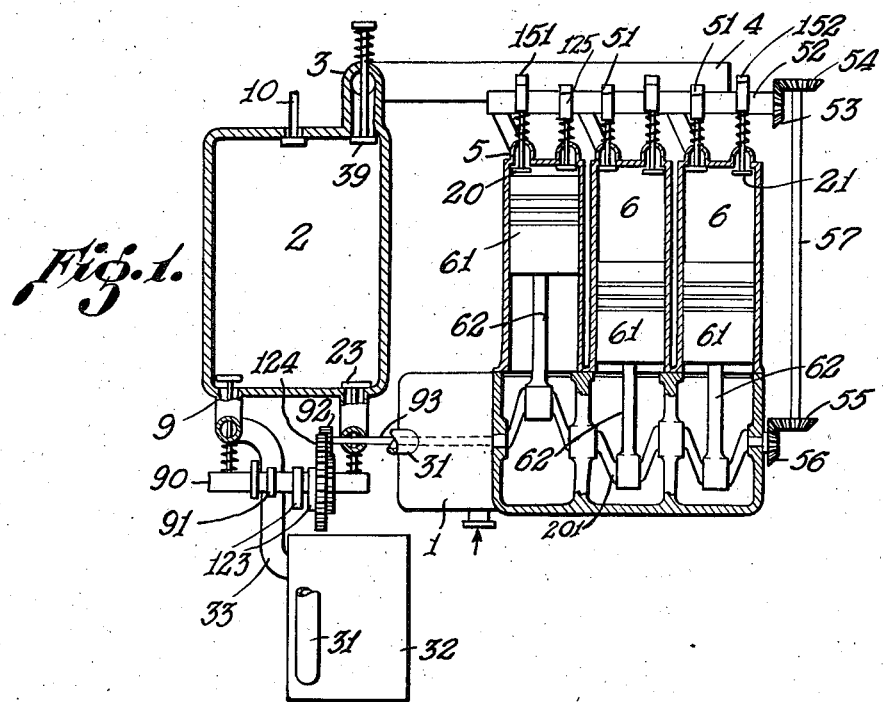
Figure 2:
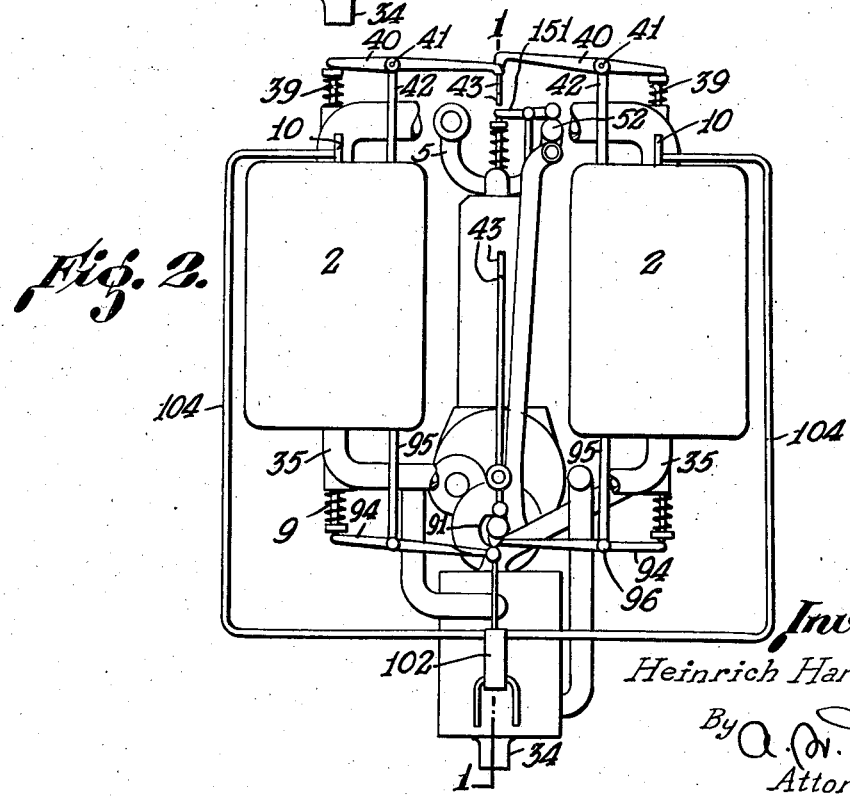
Figure 3A:
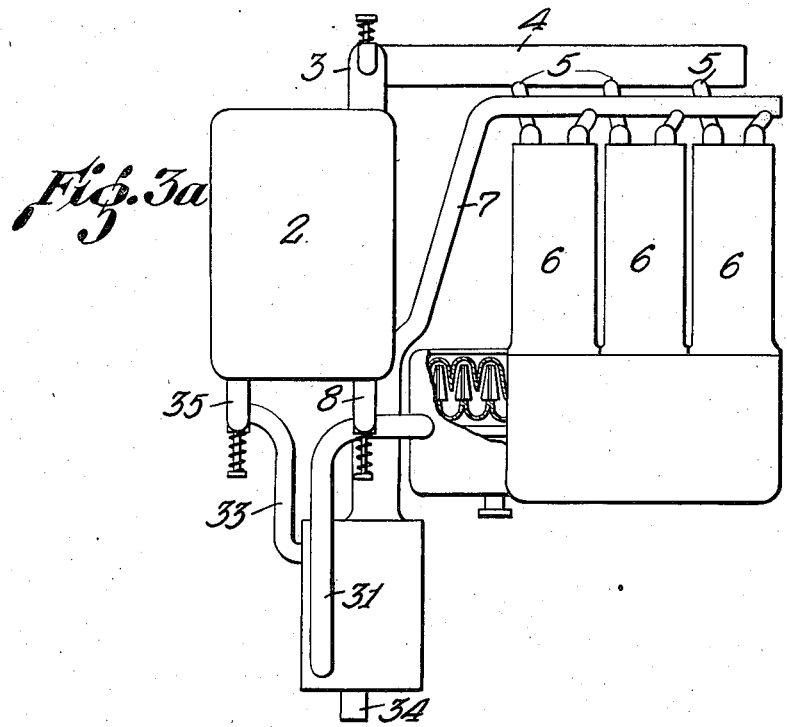
Figure 2A:
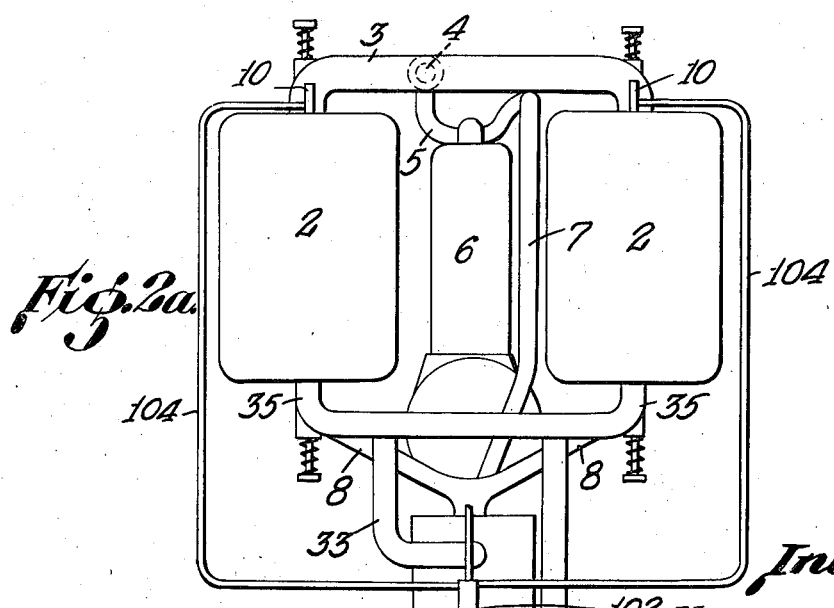

Fig. 1 is a longitudinal elevation partly in section on the line I—I of Fig. 2 of an external combustion engine according to the invention, Fig. 2 is an end elevation, Fig. 3 is a side elevation, Figs. 2a and 3a are respectively an end elevation and side elevation with certain of the parts removed to show the pipe arrangements for connecting up the various parts of the engine.

Fig. 4 is a plan view on a larger scale of the timing mechanism for operating the valves of the combustion chambers, Fig. 5 is an end view of the valve timing mechanism, Fig. 6 is a longitudinal elevation partly in section on the line 6—6 of Fig. 7 of a second constructional form of the engine, Fig. 7 is a transverse section on the line 7—7 of the combustion chamber shown in Fig. 6, Fig. 8 is a longitudinal central section through a modified form of combustion chamber, Fig. 9 is a longitudinal section of a portion of the combustion chamber shown in Fig. 8 on a larger scale, and Fig. 10 is a longitudinal elevation partly in section on a larger scale of a portion of the valve timing mechanism of the engine cylinders.

Referring to the drawings, the power plant comprises two combustion chambers 2 which are alternately charged through valves 9 with compressed air supplied by means of a compressor 1 driven by the engine crankshaft 201. After each combustion chamber has been charged with compressed air, the valve 9 is closed and liquid fuel is injected into the combustion chamber through a fuel injecting valve 10, the pressure of the air delivered by the compressor being such that its temperature is sufficient to cause ignition of the fuel. The combustion chambers 2 are connected by means of pipes 3 to a common distribution pipe 4 to which the combustion chambers deliver alternately. The power cylinders 6 are connected up to the distribution pipe 4 by means of inlet pipes 5, communication between the inlet pipes 5 and the power cylinders being controlled by means of inlet valves 20 which are actuated through rocker levers 151 by means of cams 51 on a camshaft 52 which is driven from the engine crankshaft 201 by means of bevel gears 53, 54, 55, 56 and a vertical transmission shaft 57.

On the valve 20 of one of the power cylinders 6 being opened, products of combustion are admitted from one of the combustion chambers 2 through the common distribution pipe 4 and the inlet pipe 5 of the cylinder and drive forward the piston 61, turning the crankshaft 201 which is connected to the pistons 61 of the power cylinders by means of connecting rods 62. After the crankshaft has turned through a predetermined angle, the inlet valve 5 is closed and the products of combustion in the cylinder expand until the engine reaches the end of its stroke. During the return stroke of the piston the contents of the cylinder are forced out through the exhaust valve 21 into the common exhaust pipe 7. The exhaust valves of the power cylinders are actuated through rocker levers 152 by means of cams 125 provided on the camshaft 52. In the meantime the inlet valve 20 of one of the other cylinders 6 has been opened to allow products of combustion under pressure to be admitted thereto, each cylinder being in turn supplied with products of combustion from the combustion chambers 2 and subsequently placed into communication with the exhaust pipe.

The air is delivered by the compressor 1 through a pipe 31 to a preheater 32 which is heated by the exhaust gases from the engine cylinders supplied to the preheater through the common exhaust pipe 7 and which after passing through the preheater flow out through an outlet pipe 34. The preheated air is transferred from the preheater 32 to the common inlet pipe 35 of the combustion chambers 2 through a pipe 33. The inlet valves 9 are controlled by means of cams 91 on a camshaft 90 which is driven by means of reduction gearing 92 from the shaft 93, the valves 9 being actuated by the said cams through the intermediary of levers 94 mounted on rockshafts 96 mounted in standards 95 fixed on the combustion chambers. The shaft 93 forms an extension of the compressor shaft. The compressor is shown as a rotary compressor driven directly from the engine crankshaft merely by way of illustration and it will be obvious to those skilled in the art that any type of compressor may be employed for the purpose.

In order to ensure the engine cylinders and the combustion chambers operating in step it is necessary for the camshaft 90 to rotate at a speed which will ensure the inlet valves 9 and the transfer valves 39 opening and closing at the proper times. The reduction gearing 92 is designed to provide the required step down to enable the combustion cycle in the combustion chambers to be spread over the required number of revolutions of the engine crankshaft. The transfer valves 39 are operated by levers 40 mounted on rockshafts 41 mounted in standards 42 fixed on the combustion chambers, the levers being actuated by rods 43 controlled by cams on the camshaft 90. For the sake of simplicity the rods are shown as controlled by the same cams 91 as those which control the inlet valves 9, the arrangement being such as will be understood whereby the transfer valves 39 open just after the inlet valves 9 have closed and combustion has been completed. The fuel is supplied to the fuel valves 10 by means of fuel pumps 102 operated by fuel cams 101 on the camshaft 90, the fuel being delivered by the pumps 102 through pipes 104. On the camshaft 90 are also a pair of cams 123 which operate the exhaust valves 23 through the intermediary of levers rotatably mounted on the rockshafts 96.

For the purpose of removing the residual products of combustion from the combustion chamber, cams 123 are mounted on shaft 93 driven through gearing 124. By this means, the exhaust valves are opened once for each combustion cycle of the combustion chambers. However, this removal of the residues need not take place at each operative period of the combustion chambers.

In the constructional form shown in Figs. 6 and 7 for operating on solid fuel, compressed air is delivered to the combustion chambers through the inlet valves 9 which are controlled in the same manner as the valves 9 in Figs. 1 to 5. In this case the combustion chamber inlet 11 is constructed as a nozzle, the pressure of the inflowing air being in part converted to velocity energy. The solid fuel in granular form is fed into the combustion chambers 224 through a hopper 16, which projects into the combustion chamber. From hopper 16, fuel is discharged upon grate 17 under the control of the cock 18, which is rotated from the compressor shaft by means of a driving chain 181, a countershaft 182 and bevel gearing 183. The fuel on the grate is rendered incandescent by being burnt on the grate with air. The combustion are introduced through inlet valve 9 and nozzle 11 ascends along the left-hand wall of the combustion chamber, is deflected at the top of said chamber and flows laterally along the fuel hopper into the right-hand side of the chamber where it is downwardly directed. Baffle 24 divides the air flow into two streams. The left-hand stream strikes the fuel on the grate from the top as overgrate wind, the right-hand stream is deflected by baffle 171 and strikes the fuel on the grate from the bottom, as undergrate wind. Baffle 171 again separates the stream of air into two additional partial streams. One of these partial streams flows in the left-hand direction between baffles 24 and 171, as it has been already described in the foregoing. The other of these partial streams flows in the right-hand direction along baffle 171 and then reverses its direction and will flow in the left-hand direction between baffle 171 and the bottom of the combustion chamber through the grate, as undergrate wind. Thus, all of these streams are returned to the left-hand side of the combustion chamber and start their described courses over again whereby the gases in the combustion chamber are circulated in the clockwise direction. During the circulation of the air in the combustion chamber, the air comes into contact with catalysts 15 which assists the combustion of the unburnt constituents of the fuel which are carried along by the air after passing through the fuel bed. The catalysts shown are in the form of rods of refractory material on which the catalysts are deposited in finely divided form on or in which the catalysts are incorporated. Suitable catalytic materials are for example platinum, platinum alloys, copper, silver, aluminum, copper oxide, manganese oxide or dioxide or iron oxide. Suitable carriers for the catalysts are fireclay, charcoal and asbestos.

The inlet valves 9 and the transfer valves 39 are controlled by means of a camshaft in the same manner as in the construction shown in Figs. 1 to 5 and the exhaust valves 23 are controlled in a like maner. On the transfer valve 39 of one of the combustion chambers opening, the combustion products flow through the outlet pipe 3, the baffles 24 and 171 causing the combustion products to flow along the bottom of the combustion chamber thereby causing the major part of the solid residues and ash to be deposited in proximity to the exhaust valve 23, baffle plates 22 being provided in the vertical conduit 221 for trapping the remainder of the dust and other particles. The residues collecting at the exhaust valve are removed periodically when the valve is opened. The cock 18 is rotated by means of gearing from the shaft 93 so as to deposit periodically measured quantities of fuel on the grate 17.

The combustion chamber shown in Fig. 8 is devised for burning fuel in the pulverulent form. In this case the compressed air delivered by the compressor passing through the inlet valve 9 flows through a nozzle 11 in which the air has a high velocity imparted to it. The nozzle 11 is provided with a plurality of small holes 13 through which communication is established between the nozzle and a powdered fuel container 12, which is also provided with a series of holes 14 communicating with the outside. The withdrawal of fuel from the container 12 is controlled by means of a slide valve 112 which is provided with holes adapted to register with the holes 14. The stream of air charged with fuel dust flows into the combustion chamber and the fuel is thoroughly agitated and raised to ignition temperature. The ignition of the fuel is assisted by the aid of catalysts 15 as in the case of the construction shown in Figs. 6 and 7. The combustion gases are delivered to the power cylinders through the transfer valves 39, baffles 22 being provided for preventing dust particles from entering the pipe 4 and the power cylinders. The exhaust valves 23 are operated by means of cams in the same manner as in the previously described constructions.

Fig. 10 shows on a larger scale a portion of the camshaft for controlling the valves of the power cylinders. In order to enable the power cylinders to operate with variable admission, the camshaft 52 is slidable lengthwise relatively to the levers 151 and 152 and is provided with a grooved collar 521 for engagement with a shifting fork. The inlet cams are tapered off lengthwise so that the period during which the lever 151 will be raised will vary with the lengthwise displacement of the camshaft, which is splined to the bevel gear 53. Since a single operating cycle of the combustion chambers has to supply combustion products for a plurality of operating periods of the power cylinders, a considerable quantity of fuel has to be introduced into the combustion chambers for each operating cycle thereof, and such substantial quantity can be easily controlled with great accuracy. Variations in the speed of revolution are also without influence on the course of the combustion. The uniting of a number of cycles of the power cylinders in the combustion chamber results in larger injection or feed arrangements which are more simple and more reliable in operation. Finally, the relatively very great combustion space of the combustion chambers makes it possible to place catalytically effective contacts in a very favourable position, whereby the combustion may be assisted and other advantages realised.

What is claimed is:

1. In a system for producing mechanical energy, the combination comprising a reciprocating engine having a plurality of cylinders and a rotary drive shaft, inlet and exhaust valves for said cylinders, a plurality of combustion chambers for supplying driving fluid under pressure to said engine, each of said combustion chambers having a volume which is a multiple of the combined admission volumes of said cylinders, a grate in each combustion chamber, a fuel hopper within the upper portion of each combustion chamber and above said grate, means operatively connected to the engine drive shaft for periodically discharging predetermined quantities of fuel in granular form from said hopper to said grate, means including a nozzle and an inlet valve for each of said combustion chambers and a compressor actuated by the engine drive shaft in common for said chambers for introducing air at a high velocity into said chambers tangentially of the walls thereof, baffles in each of said chambers constructed and arranged to guide the air and the combustion products between said hopper and said grate to produce circulation thereof, a transfer valve for each of said chambers, conduit means for connecting each of said transfer valves with the inlet valves of said cylinders, and means operated by the rotation of said engine drive shaft once during a plurality of revolutions thereof for actuating said valves of the combustion chambers in such predetermined sequence that said chambers are alternately carried through a charging and discharging cycle, said charging cycle including charging said chamber with compressed air and fuel and igniting the same, said discharging cycle including discharge of the combustion gases produced under their own and gradually decreasing pressure into said reciprocating engine to cause several revolutions thereof.

2. In a system for producing mechanical energy, the combination comprising a reciprocating engine having a plurality of cylinders and a rotary drive shaft, inlet and exhaust valves for said cylinders, a plurality of combustion chambers for supplying driving fluid under pressure to said engine, each of said combustion chambers having a volume which is a multiple of the combined admission volumes of said cylinders, a grate in each combustion chamber, a fuel hopper within the upper portion of said combustion chamber and above said grate, means operatively connected to the engine drive shaft for periodically discharging predetermined amounts of fuel in granular form from said hopper to said grate, means including a nozzle and an inlet valve for each of said combustion chambers and a compressor actuated by the engine drive shaft in common for said chambers for introducing air at a high velocity into said chambers tangentially of the walls thereof, baffles in each of said chambers constructed and arranged to guide the air and the combustion products between said hopper and said grate to produce circulation thereof, a transfer valve and an exhaust valve for each of said chambers, conduit means for connecting each of said transfer valves with the inlet valves of said cylinders, a transfer conduit within said chambers to connect said transfer valve with the lower portion of said chambers in proximity to the exhaust valve, deflecting means in said transfer conduit to trap solid combustion residues and deposit the major portion thereof in proximity to the exhaust valve, and means operated by the rotation of said engine drive shaft once during a plurality of revolutions thereof for actuating said valves of the combustion chambers in such predetermined sequence that said chambers are alternately carried through a charging and discharging cycle, said charging cycle including charging said chamber with compressed air and fuel and igniting the same, said discharging cycle including discharge of the combustion gases produced under their own and gradually decreasing pressure into said reciprocating engine to cause several revolutions thereof.

HEINRICH HARDENSETT.